July 27, 1954
R. F. LINDGREN
2,684,561
GRINDING MECHANISM
Filed Feb. 12, 1952
2 Sheets-Sheet 2
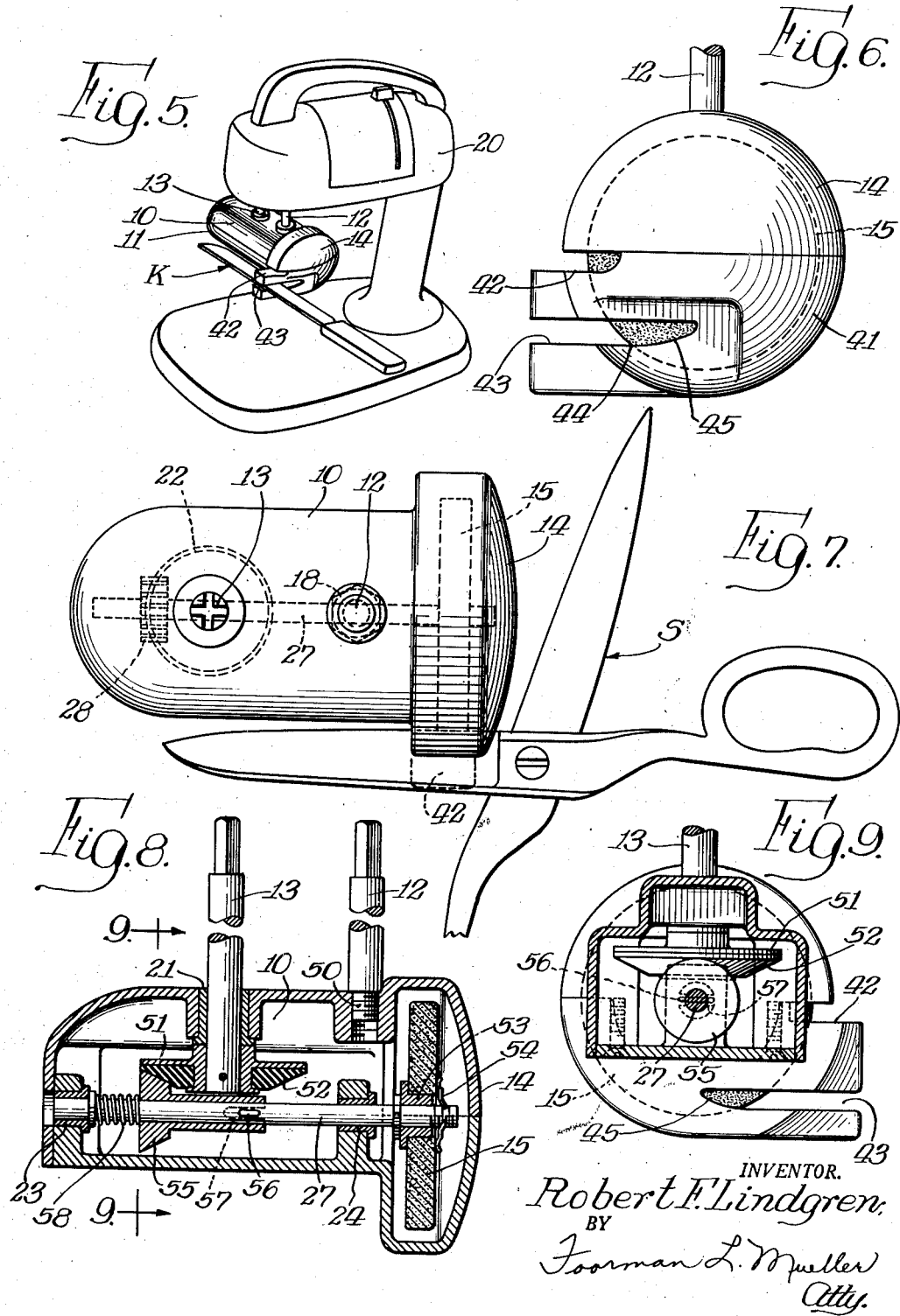
INVENTOR.
Robert F. Lindgren
BY
Foorman L. Mueller
Atty.

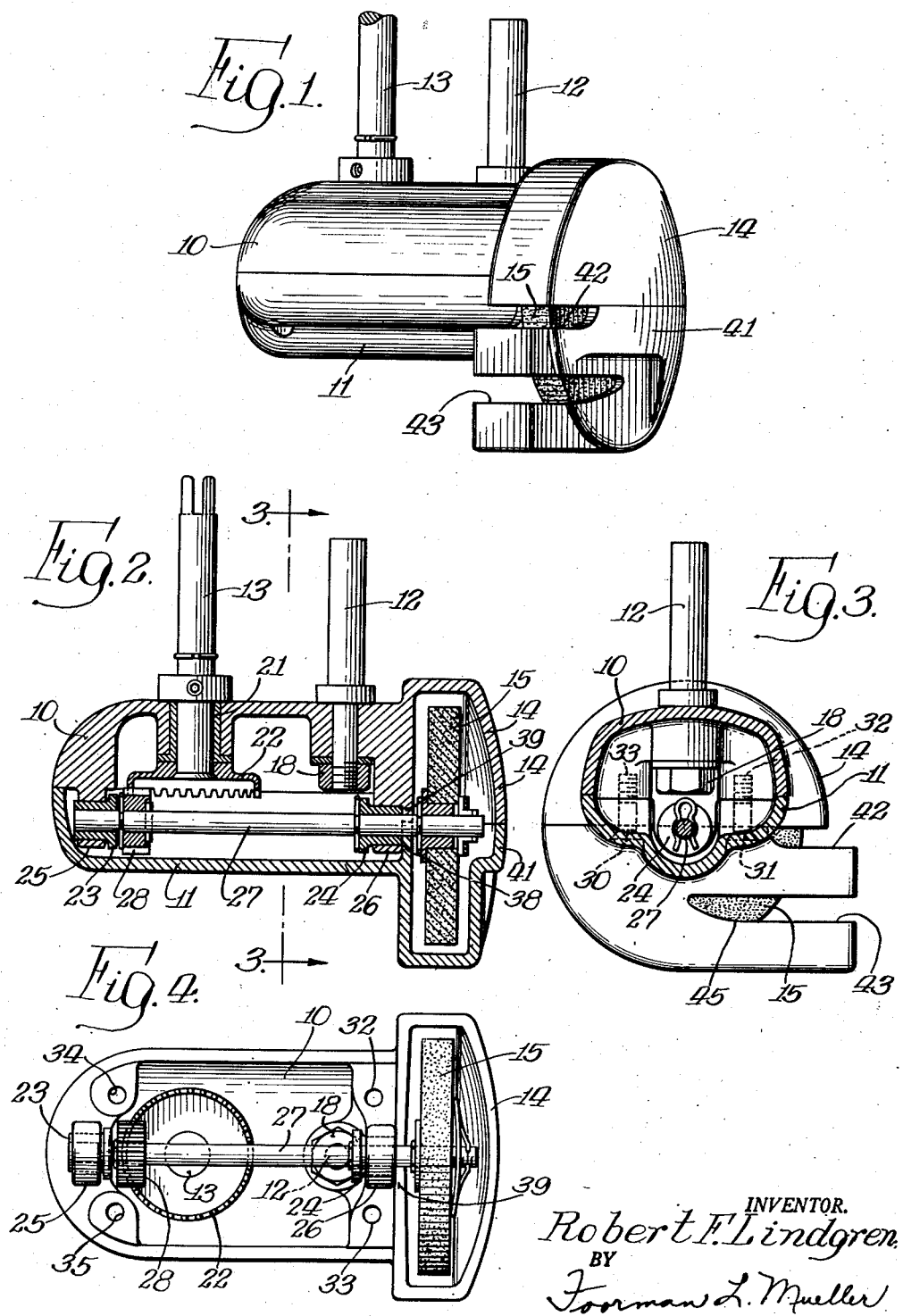

Patented July 27, 1954

2,684,561

UNITED STATES PATENT OFFICE 2,684,561

GRINDING MECHANISM

Robert F. Lindgren, Aurora, Ill., assignor to Daco, Incorporated, Aurora, Ill., a corporation of Illinois Application February 12, 1952, Serial No. 271,197

1 Claim. (Cl. 51—241)

The present invention relates to grinding devices and more particularly to a grinding wheel attachment for use with electric appliances of the type having power takeoffs.

There is a great demand for a simple and foolproof grinding device for use in the kitchen to grind the cutting edges on household knives, scissors, or the like. It is of course desirable that the grinding device be power driven. The widespread use of electric kitchen appliances such as food mixers or the like constitutes a ready source of power, inasmuch as these appliances are usually provided with power takeoff connections and supporting journals or bearings to which power driven attachments may be removably secured.

It is an object of the present invention to provide a simple, effective and compact grinding attachment for use with the power takeoff of household electric appliances.

Another object of the invention is to provide a grinding attachment for household electric appliances which safely encloses the transmission mechanism and grinding wheel and includes means to guide a grindable surface into contact with the grinding wheel in a manner which insures the proper grinding angle.

A further object of the invention is to provide an improved power driven grinding attachment having means to guide the grindable surface into correct angular engagement with the surface of the grinding wheel, the guiding means further providing automatic maintenance of the correct cutting angle as the grinding wheel wears down in size.

Yet another object of one form of the invention is to provide a grinding attachment for electric appliances, the grinding attachment being automatically responsive to overload conditions to disconnect the driving connection with the appliance and thereby prevent damage to the appliance in the event of jamming or overload of the grinding wheel.

A feature of the invention is the provision of a housing adapted to be removably secured to a household electric appliance such as a kitchen food mixer and to safely enclose a rotatable grinding wheel and transmission mechanism therefor, the housing having a slot, or slots, to receive and guide a grindable surface into correct angular engagement with the grinding wheel.

Another feature of the grinding attachment of the invention as particularly intended for use with electric food mixers is the provision of a housing for supporting and enclosing a rotatable grinding wheel and transmission therefor, the housing having an idler supporting spindle to be removably received in a journal supporting member of the food mixer, and a driving spindle for engagement with the power takeoff of the food mixer to thus provide a simple and compact removable grinder attachment.

Another feature of one form of the invention is the provision of a housing adapted to be removably secured to an electric appliance, and having a drive spindle extending therefrom for engagement with a power takeoff of the appliance, the drive spindle being connected through an overload release transmission mechanism to a grinding wheel shaft enclosed within the housing.

Further objects, features and the attending advantages of the invention will be apparent with reference to the following specification and drawings in which:

Figure 1 is a perspective elevation of the grinding attachment of the invention;

Figure 2 is a longitudinal cross section of the grinding attachment;

Figure 3 is a section on the line 3—3 of Figure 2;

Figure 4 is a bottom plan view with the cover removed;

Figure 5 is a perspective elevation of the grinding attachment of the invention shown as attached to an electric kitchen appliance of the food mixer type;

Figure 6 is a view of the grinding end of the attachment;

Figure 7 is a top plan view of the grinding attachment and showing its use for scissors grinding;

Figure 8 is a longitudinal section to show another embodiment of the invention having a modified transmission; and Figure 9 is a cross section on the line 9—9 of Figure 8.

In practicing the invention, a grinding attachment is provided with a compact housing for supporting and enclosing a grinding wheel and drive transmission therefor. An idler supporting spindle extends from the housing to be received in a suitable journal support of the electric appliance to which the attachment may be detachably secured. A drive spindle also extends from the housing to engage suitable power takeoff means of the electric appliance. The drive spindle extends into the attachment housing, and a drive member such as a gear member or a friction disk is secured thereto within the housing. A driven shaft is journaled by the housing to extend therethrough at an angle to the drive spindle axis and a grinding wheel is secured to one end of the shaft. A driven member such as a pinion gear or friction cone is keyed on the driven shaft and is adapted to engage the drive member to be driven thereby. In one form of the invention the driven member may be slidably movable on the shaft and a spring normally urges the driven member into driving engagement with the drive member, but overload conditions will cause the driven member to move against the tension of the spring and away from the drive member to thus provide an automatic overload release transmission. The grinding wheel is substantially enclosed within the housing and at least one slot in the housing is provided for insertion of a grindable surface to be thus moved into engagement with the surface of the cutting wheel and ground thereby. A plurality of slots may be provided to obtain various angles of grinding engagement with the grinding wheel to thus accommodate different types of edge surfaces to be ground, such as knives, scissors, or the like. The slot for receiving and guiding a knife edge into proper grinding engagement with the periphery of the grinding wheel may be located at a tangent angle to the grinding wheel such as to provide a grinding angle of about 20° to thus produce a hollow ground knife edge. If desired, the knife edge guiding slot may further be provided with a curve on the inner end of the slot wall furthest away from the grinding wheel axis, the curve being directed inwardly towards the axis of the grinding wheel to automatically direct the knife edge into the correct angular engagement with the periphery of the grinding wheel as the wheel wears down in size and the knife edge moves inward of the slot. A transverse wall may also be provided in the housing to separate the grinding wheel from the transmission mechanism in order to keep grinding dust out of the transmission.

Referring to Figure 1 of the drawings, the grinding attachment is shown to include a housing for enclosing the transmission drive mechanism and the grinding wheel, the housing being formed of a two-piece casting including a main housing member casting 10 and a cover member casting 11. A fixed supporting spindle 12 is secured to the main housing member casting 10, and a rotatable drive spindle 13 is rotatably journaled to extend from the main housing member 10. The enlarged rounded end 14 of the housing encloses the grinding wheel 15, and guide slots, such as shown at 42 and 43 may be provided to guide a grindable surface into predetermined angles of grinding contact with the surface of the grinding wheel 15.

As more clearly shown in Figures 2 through 5 of the drawings, the fixed supporting spindle 12 may be secured to the main housing member 10 at its inner threaded end by the nut 18. The fixed supporting spindle 12 is intended to be received in a suitable journal bearing support of the electric food mixing machine 20 for detachably supporting the grinding attachment in the manner shown. When the grinding attachment is thus mounted on the appliance 20, the drive shaft 13 engages a power take-off of the appliance, so that the energization of the electric appliance 20 will be effective to power the transmission mechanism of the grinding attachment.

The rotatable drive shaft 13 is journaled at 21 in the main housing member 10, and is provided with an angle drive member, such as the crown gear 22, keyed to rotate therewith within the housing. Journal bearing supports 23, 24 are secured by a press fit to the extending boss portions 25 and 26 of the main housing member 10. A driven shaft 27 is rotatably journaled within the bearing supports 23 and 24 at an angle to the drive shaft 13. The grinding wheel 15 is secured, as shown, to one end of the shaft 27 to be rotated therewith. A pinion gear 28 is also keyed to the shaft 27 in a position to engage the driving teeth of the crown gear 22.

The cover member 11 of the housing is secured to the main housing member 10 by means of a plurality of bolts such as those shown at 30 and 31 for engagement in the threaded apertures 32 and 33. Similarly threaded apertures 34 and 35 are provided for additional bolts to secure the housing castings 10 and 11 in the assembled relation. It will be noted that the cover member 11 of the housing has a transverse wall portion 38 which mates with a similar transverse wall portion 39 of the main housing member casting 10 to provide a transverse partitional wall to separate the grinding wheel enclosure from the transmission mechanism enclosure. Such an arrangement serves to prevent grinding dust from the grinding wheel 15 from entering the transmission enclosure and causing excessive wear of the mechanism.

As more clearly shown in Figures 6 and 7 of the drawings, the end 41 of the housing cover member 11, that is positioned to surround and enclose the grinding wheel 15, may be provided with a plurality of guiding slots such as shown at 42 and 43. The slots are adapted to receive and guide an edge of a grindable surface to be ground into contact with the grinding wheel 15. The slot 42 may be particularly intended to receive a scissors edge S in the position shown for grinding, whereas the slot 43 is particularly intended to receive a knife edge K in the position shown for grinding. The slot 42 extends inward of the housing in a plane substantially intersecting the axis of the grinding wheel, so that in effect a substantially perpendicular grinding angle of peripheral contact for a scissors edge surface to be guided by the slot 42 is obtained. In order to produce a long-wearing, hollow-ground knife edge, it is desirable to employ a grinding angle of about 20° tangent to the periphery of the grinding wheel 15. The slot 43 is thus located in a position to produce the desired tangential angle at the point of grinding contact 44 and extends inward of the housing in a plane forming an approximate 20° tangent angle with the peripheral grinding edge surface of the grinding wheel. It will be noted that the inner end of the slot 43 is provided with a curved surface on the wall portion 45 which is furthest away from the axis of the grinding wheel, and the curved surface is directed toward the grinding wheel axis inwards of the slot. As the grinding wheel 15 wears down in size, the knife edge will be guided by the curved surface 45 inward toward the grinding axis to thus maintain the desired approximate 20° tangential grinding angle. The curved surface 45 is an important feature of the invention in that it assures the correct grinding angle for grinding a long-wearing, hollow-ground form of knife edge.

A modified form of the invention will be described in connection with Figures 8 and 9 of the drawings in which a somewhat different form of transmission mechanism is provided. The idler supporting spindle 12 is rigidly secured to the housing 10 by means of the threaded connection 50. It should be understood that the idler spindle 12 as used with either embodiment of the invention may take the form of any suitable supporting element by means of which the detachable grinding attachment may be removably secured to an electric appliance such as a food mixer or the like. Rotatably secured to the driving spindle 13 within the housing 10 is a right angle drive member 51, which, in the embodiment shown in Figure 8 of the drawings, may be a friction disc having an angular friction driving surface 52. The driven shaft 27 is rotatably journaled in the bearing members 23 and 24 to be positioned at substantially a right angle to the drive spindle 13. The grinding wheel 15 is secured to one end of the driven shaft 27 by means of the collar 53 and locking nut 54. A driven member or friction cone 55 is slidably positioned on the shaft 27 and keyed thereto by means of the key 56 and key slot 57. A coil spring 58 normally urges the driven angle member 55 into contact with the driving face 52 of the angle friction drive member 51. In the event of excessive loading on the grinding wheel 15, tending to stop rotation of the driven shaft 27, the driven member 55 will be moved against the tension of the compression spring 58 away from the driving surface 52 to provide an automatic overload release for the transmission drive mechanism.

When using either the gear drive mechanism particularly described in connection with Figures 2 and 4 of the drawings, or the friction drive mechanism particularly described in connection with Figures 8 and 9 of the drawings, a suitable grinding speed is obtained by a 2-to-1 ratio step-up between the drive member and the driven member.

In the foregoing description I have described a grinding attachment particularly intended for use with kitchen appliances such as food mixers or the like. The grinding attachment provides a housing for enclosing an angle drive transmission mechanism, and for also enclosing a grinding wheel. Slots are provided on the grinding wheel enclosure of the housing to guide a grindable surface into predetermined grinding angle of contact with the grinding wheel and the arrangement may be such that grinding dust from the grinding wheel enclosure is prevented from entering the transmission mechanism enclosure. In one form of the invention, the transmission mechanism may be arranged to automatically disconnect the driving connection to the electric appliance in the event of overload on the grinding wheel.

It should be obvious that various modifications may be made within the spirit of the invention and the scope of the appended claim. For example, the angular arrangement of the slots for guiding the grindable surface to be ground into engagement with the grinding wheel may be varied from the position shown in order to accommodate various other types of grindable surfaces and grinding edges.

I claim:

A grinder attachment for use with an electrically driven appliance of the type having attachment supporting journal means and power takeoff means including in combination, a two-piece housing comprising a main housing member and a cover housing member, a fixed supporting spindle secured to said main housing member and extending outwardly therefrom at right angles to the longitudinal axis thereof, a drive spindle rotatably journaled in said main housing member and extending outwardly therefrom in spaced parallel relation with said fixed supporting spindle, said fixed supporting spindle being adapted to be received in the supporting journal means of the appliance and said drive spindle being adapted to be received in the power takeoff means thereof, gear means affixed to said drive spindle within said main housing member and adapted to be rotated thereby, a pair of axially aligned spaced boss portions formed in one of said housing members, a driven shaft rotatably journaled within said boss portions and extending at right angles to said drive spindle, further gear means affixed to one end of said driven shaft and engaging said first mentioned gear means to be driven thereby, a grinding wheel secured to the other end of said driven shaft to be rotated thereby, said housing members each having an enlarged end portion and having respective mating transverse wall portions to enclose said grinding wheel, and the enlarged end portion of at least one of said housing members having at least one guiding slot therein to receive and guide an edge of a surface to be ground into contact with said grinding wheel.

References Cited in the file of this patent

UNITED STATES PATENTS

| Number | Name | Date |
|---|---|---|
| 525,414 | Ginn | Sept. 4, 1894 |
| 688,505 | Beibler | Dec. 10, 1901 |
| 1,370,964 | Hansen | Mar. 8, 1921 |
| 1,417,228 | Blocker | May 23, 1922 |
| 1,439,711 | Reder | Dec. 26, 1922 |
| 1,633,085 | Forshaw | June 21, 1927 |
| 1,860,211 | Stimpson | May 24, 1932 |
| 2,431,939 | Johnson | Dec. 2, 1947 |
| 2,464,660 | White | Mar. 15, 1949 |
| 2,555,048 | Long | May 29, 1951 |
| 2,563,541 | MacFarland et al. | Aug. 7, 1951 |
| 2,573,377 | Wolbaum | Oct. 30, 1951 |